(12) United States Patent
Takahashi et al.

(10) Patent No.: US 12,163,245 B2
(45) Date of Patent: Dec. 10, 2024

(54) TITANIUM MATERIAL AND COATED TITANIUM MATERIAL

(71) Applicant: NIPPON STEEL CORPORATION, Tokyo (JP)

(72) Inventors: Kazuhiro Takahashi, Tokyo (JP); Koji Akioka, Tokyo (JP); Eiji Ikeda, Tokyo (JP); Hideya Kaminaka, Nishinomiya (JP)

(73) Assignee: NIPPON STEEL CORPORATION, Tokyo (JP)

( * ) Notice: Subject to any disclaimer, the term of this patent is extended or adjusted under 35 U.S.C. 154(b) by 773 days.

(21) Appl. No.: 17/295,134

(22) PCT Filed: Jan. 23, 2020

(86) PCT No.: PCT/JP2020/002295
§ 371 (c)(1),
(2) Date: May 19, 2021

(87) PCT Pub. No.: WO2020/153422
PCT Pub. Date: Jul. 30, 2020

(65) Prior Publication Data
US 2022/0002894 A1    Jan. 6, 2022

(30) Foreign Application Priority Data

Jan. 23, 2019  (JP) .................... 2019-009749

(51) Int. Cl.
B32B 15/04   (2006.01)
C25D 9/02    (2006.01)
C25D 11/26   (2006.01)

(52) U.S. Cl.
CPC ............ *C25D 9/02* (2013.01); *C25D 11/26* (2013.01); *B32B 15/043* (2013.01); *Y10T 428/1259* (2015.01); *Y10T 428/12611* (2015.01); *Y10T 428/12806* (2015.01)

(58) Field of Classification Search
None
See application file for complete search history.

(56) References Cited

FOREIGN PATENT DOCUMENTS

| CN | 106521466 B | * | 6/2019 | ............ C23C 22/13 |
|---|---|---|---|---|
| JP | S61-276996 A | | 12/1986 | |
| JP | S63-14898 A | | 1/1988 | |
| JP | H05-263265 A | | 10/1993 | |
| JP | H06-81112 A | | 3/1994 | |

(Continued)

*Primary Examiner* — Xiaobei Wang
(74) *Attorney, Agent, or Firm* — Myers Wolin, LLC

(57) ABSTRACT

A coated titanium material includes a titanium material and a coating film formed on a surface of the titanium material. A Ti-based oxide is included in an interface between the titanium material and the coating film. The Ti-based oxide is one or both rutile type $TiO_2$ and $Ti_2O_3$. In a case where a cut surface of the coating film is formed by using a SAICAS method under conditions that a horizontal speed is 2 μm/s and a vertical speed is 0.1 μm/s, on the cut surface, an area percentage of the Ti-based oxide is 30.0% or more in a region having a distance of 15 μm from a reference line specified on the basis of a boundary line, which is an intersection line between the cut surface and the interface, to a coating film side.

2 Claims, 4 Drawing Sheets

(56) References Cited

FOREIGN PATENT DOCUMENTS

| JP | H06-228797 A | 8/1994 |
|----|--------------|--------|
| JP | 2002-187399 A | 7/2002 |
| JP | 2003-236604 A | 8/2003 |

* cited by examiner

TITANIUM MATERIAL AND COATED TITANIUM MATERIAL

CROSS-REFERENCE TO RELATED APPLICATION

This application is a National Phase of PCT/JP2020/002295, filed on Jan. 23, 2020, and which designated the U.S., which claims priority to Japanese Patent Application No. 2019-009749, filed on Jan. 23, 2019. The contents of each are wholly incorporated herein by reference.

Technical Field

The present disclosure relates to a titanium material and a coated titanium material.

Priority is claimed on Japanese Patent Application No. 2019-009749, filed in Japan on Jan. 23, 2019, the content of which is incorporated herein by reference.

RELATED ART

Since titanium materials are lightweight and have excellent strength and corrosion resistance, the titanium materials are used for engine parts and mufflers of automobiles, mainly for motorcycles. Most of these are used without coating on titanium. Meanwhile, in a case where the titanium materials are applied to body-related members and exterior members of the automobiles and the motorcycles (hereinafter, described as "automobile body-related members"), designability can be further enhanced by applying a coating to titanium. For this reason, in the titanium materials, it is necessary to improve the adhesion of a coating film, and the following studies have been made.

For example, Patent Documents 1 and 2 disclose a titanium material having improved coating adhesion by coating a titanium surface with iron, tin, zinc or the like by using shot blasting or vapor deposition.

Additionally, Patent Document 3 discloses a titanium material having improved coating film adhesion by performing anodization to form a porous oxide film on a titanium surface. Similarly, Patent Document 4 also discloses a titanium material utilizing anodization. In the titanium material disclosed in Patent Document 4, an oxide film is formed on a surface of the titanium material, and then an acrylic resin-based electrodeposition coating film is formed to improve the coating film adhesion.

RELATED ART DOCUMENT

[Patent Document]
[Patent Document 1] Japanese Unexamined Patent Application, First Publication No. H05-263265
[Patent Document 2] Japanese Unexamined Patent Application, First Publication No. H06-81112
[Patent Document 3] Japanese Unexamined Patent Application, First Publication No. S63-14898
[Patent Document 4] Japanese Unexamined Patent Application, First Publication No. H06-228797

SUMMARY

Problems to be Solved

Among the automobile body-related members, there are members having complicated shapes. In a case where a method using titanium shot blasting or the like disclosed in Patent Documents 1 and 2 is applied to such members having complicated shapes, there may be spots where the shot blasting or the like cannot be sufficiently performed. For this reason, there is a case where the adhesion of the coating film decreases.

Meanwhile, members for automobiles made of a steel material or the like are generally coated through coating steps referred to as a chemical conversion step, an electrodeposition coating step, and a finish coating step in this order. The titanium materials are less likely to be corroded and less likely to undergo a chemical conversion reaction. For this reason, the electrodeposition coating step is particularly important for the coatability of final products. Additionally, from applications as members for automobiles, the electrodeposition coating film formed in the above step is required to have difficulty in exfoliation, that is, peeling strength, in addition to the adhesion.

Here, in the electrodeposition coating step, an electric current is allowed to flow between a metallic material and an electrode plate in a liquid of coating material of an electrodeposition coating film containing a resin or the like (hereinafter, also referred to as "electrodeposition coating material") to form an electrodeposition coating film. Then, electrodeposition in which an electric current is allowed to flow using the metallic material as a cathode is referred to as cation electrodeposition, and electrodeposition in which an electric current is allowed to flow using the metallic material as an anode is referred to as anion electrodeposition. In the electrodeposition coating for automobile applications, the cation electrodeposition is general.

In the titanium material disclosed in Patent Documents 3 and 4, a titanium oxide layer having low conductivity is formed by the anodization. For that reason, when an attempt is made to form a coating film on the titanium material by the cation electrodeposition, the conductivity is insufficient and it is difficult for an electric current to flow uniformly. As a result, it becomes difficult to control the thickness of the electrodeposition coating film, a uniform coating film is not formed, and the coating film adhesion and peeling strength decrease. Moreover, in a case where the electrodeposition coating is applied to the titanium material using an acrylic resin as in the technique disclosed in Patent Document 4, there is a case where the heat resistance and solvent resistance of the electrodeposition coating film are insufficient, and there is a case where an excellent coating film is not formed by finish coating or the like.

An object of the present disclosure is to solve the above problems and to provide a coated titanium material having excellent coating film adhesion and peeling strength of the coating film, and a titanium material used therefor.

Means for Solving the Problem

The present disclosure has been made to solve the above problems, and the following titanium materials and coated titanium materials are the gist of the present disclosure.

(1) A coated titanium material including a titanium material; and a coating film formed on a surface of the titanium material,
in which a Ti-based oxide is included in an interface between the titanium material and the coating film,
the Ti-based oxide is one or both rutile type $TiO_2$ and $Ti_2O_3$, and
in a case where a cut surface of the coating film is formed by using a SAICAS method under conditions that a horizontal speed is 2 μm/s and a vertical speed is 0.1 μm/s, on the cut surface, an area percentage of the Ti-based oxide is 30.0% or more in a region having a distance of 15 μm from a reference line specified on the basis of a boundary line, which is an intersection line between the cut surface and the interface, to a coating film side.

(2) The coated titanium material according to the above (1) in which the coating film is an electrodeposition coating film including a modified epoxy resin.

(3) A titanium material including a titanium substrate; and a Ti-containing compound that coats a part of a surface of the titanium substrate, in which the titanium substrate includes industrial pure titanium or a titanium alloy, the Ti-containing compound has a peak in a range of 320 to 350 $cm^{-1}$ in a spectrum obtained by Raman spectroscopy, and an area percentage of the Ti-containing compound coating the surface is 10.0 to 50.0%.

(4) The titanium material according to the above (3) in which the area percentage of the Ti-containing compound is 25.0 to 50.0%.

(5) The titanium material according to the above (3) or (4) in which the Ti-containing compound includes two or more elements selected from the group consisting of Fe, C, O, and N.

Effects

According to the present disclosure, it is possible to obtain the coated titanium material having excellent coating film adhesion and peeling strength of the coating film, and the titanium material used therefor.

DETAILED DESCRIPTION

Figure 1A:
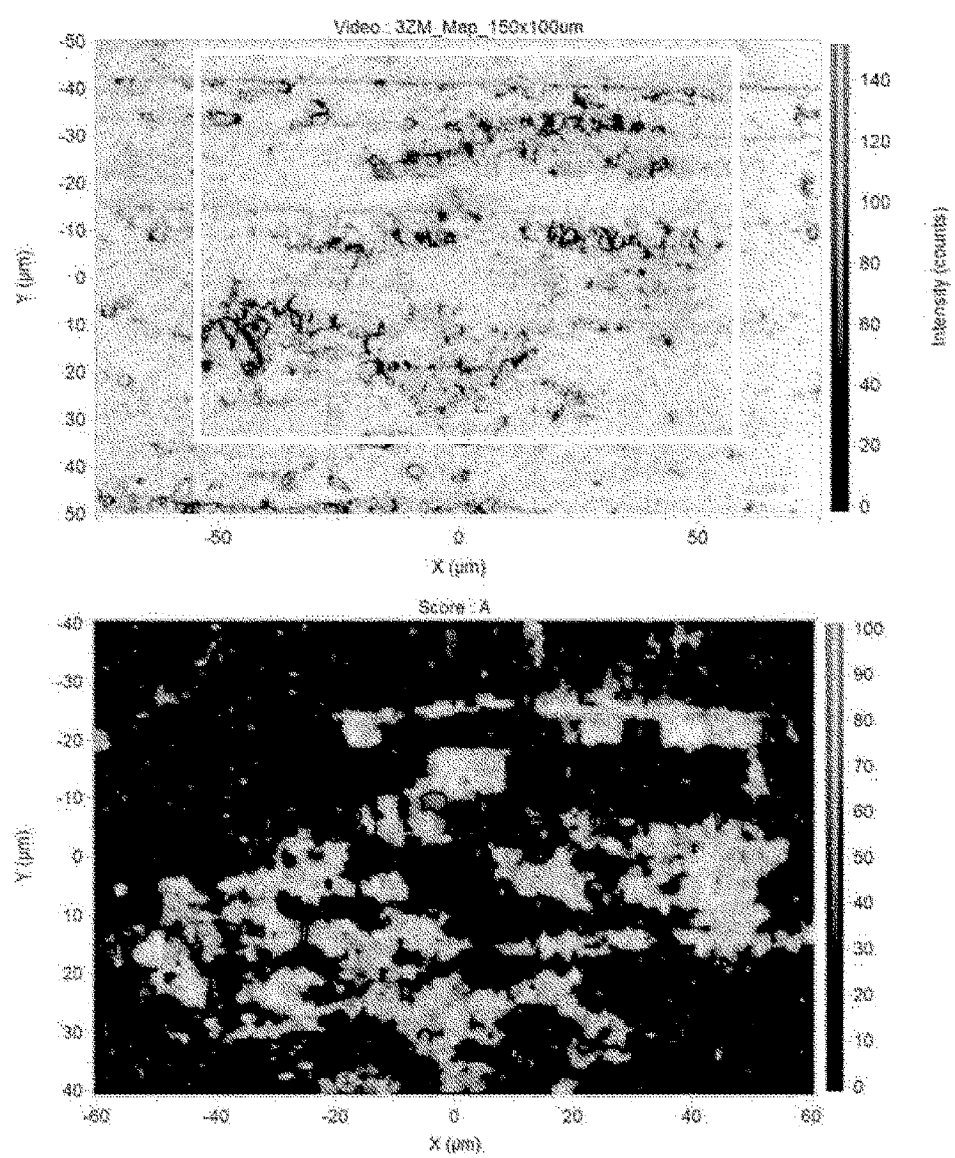
FIG. 1A is a photograph of the surface of a titanium material (an example of the present disclosure) having an area percentage of a Ti-containing compound of 25.0% and is a view showing the distribution of the Ti-containing compound having a peak in a range of 320 to 350 $cm^{-1}$ in a spectrum obtained by the Raman spectroscopy.

The present inventors have performed various studies in order to obtain a coated titanium material having excellent coating adhesion and peeling strength of a coating film. As a result, the following findings (a) to (c) were obtained.

(a) In the coated titanium material having low adhesion and peeling strength, there was a case where a minute but hole-like portion in which an electrodeposition coating film was not formed was observed. The cause of this is considered to be a passivation film formed on the surface of the titanium material. This passivation film is a film that is liquid and stable in a wide range of pH 1 to 12 and maintains its film structure even during chemical conversion and electrodeposition coating, for example.

(b) When a steel material is subjected to the chemical conversion, a reaction layer (so-called chemical conversion film) is formed while a base metal is etched, or roughening that causes a wedge effect occurs. Then, it is considered that a coating film grows uniformly with such a reaction layer and a roughened surface as a starting point. Meanwhile, on the surface of the titanium material covered with the extremely stable passivation film, the above-described reaction layer is not formed or roughened, and it is difficult to form a uniform electrodeposition coating film.

(c) By forming a Ti-containing compound (for example, a Ti-containing compound including two or more elements selected from the group consisting of Fe, C, O, and N) in advance on the surface of the titanium material, the electrodeposition coating film grows easily. Due to the above Ti-containing compound, rutile type $TiO_2$ and $Ti_2O_3$ are formed at an interface between the titanium material and the coating film during the electrodeposition coating, and these oxides form nuclei. Accordingly, it is considered that a uniform coating film grows.

The present disclosure has been made on the basis of the above findings. Hereinafter, a preferred embodiment of the present disclosure will be described in detail, and in that case, the preferred embodiment of the present disclosure will be described as the present disclosure.

1. Titanium Material

The titanium material according to the present disclosure includes a titanium substrate and a Ti-containing compound that coats a part of the surface of the titanium substrate.

1-1. Chemical Composition of Titanium Substrate

The titanium substrate includes industrial pure titanium or a titanium alloy. Here, the industrial pure titanium means a metal material containing 98.8% or more of Ti and the remainder being impurities. As general industrial pure titaniums, for example, JIS Types 1 to 4 and ASTM/ASME Grades 1 to 4 are exemplified. These industrial pure titaniums contain C, H, O, N, Fe, and the like as impurity elements, and the content of each element is defined as shown below.

Specifically, C: 0.08% or less, H: 0.015% or less, O: 0.40% or less, N: 0.05% or less, and Fe: 0.50% or less.

Additionally, the titanium alloy may be a general-purpose titanium alloy. The titanium alloy includes Ti-3Al-2.5V, Ti-1Fe-0.35O, and the like are exemplary examples. Ti-3Al-2.5V has official standards of JIS61 Type and ASTM Grade 9. The strength of Ti-1Fe-0.35O is increased by adding Fe and O, which are general-purpose elements, without adding Al and V.

1-2. Ti-Containing Compound

The Ti-containing compound has a peak in a range of 320 to 350 $cm^{-1}$ in a spectrum obtained by the Raman spectroscopy.

Although no specific phase has been identified for the Ti-containing compound, the above peak coincides with the shift peak of the piezoblockite type $Fe_2TiO_5$ or TiCN. From this, there is a possibility that the above Ti-containing compound is a piezoblockite type $Fe_2TiO_5$ or TiCN.

Similarly, when an analysis is performed using Auger electron spectroscopy, it can be seen that the Ti-containing compound includes Ti: 10 to 14%, Fe: 8 to 9%, C: 27 to 40%, and O: 40 to 50% in atomic %. Additionally, for example, there is a case where an extremely small amount of S is detected about 1%. In addition, in the Auger electron spectroscopy, N cannot be detected separately from Ti, but it is considered that N is also included from the analysis results of the X-ray photoelectron spectroscopy (XPS). Based on the above, it is considered that the above Ti-containing compound is a Ti-containing compound including two or more elements selected from the group consisting of Fe, C, O, and N.

Figure 1B:
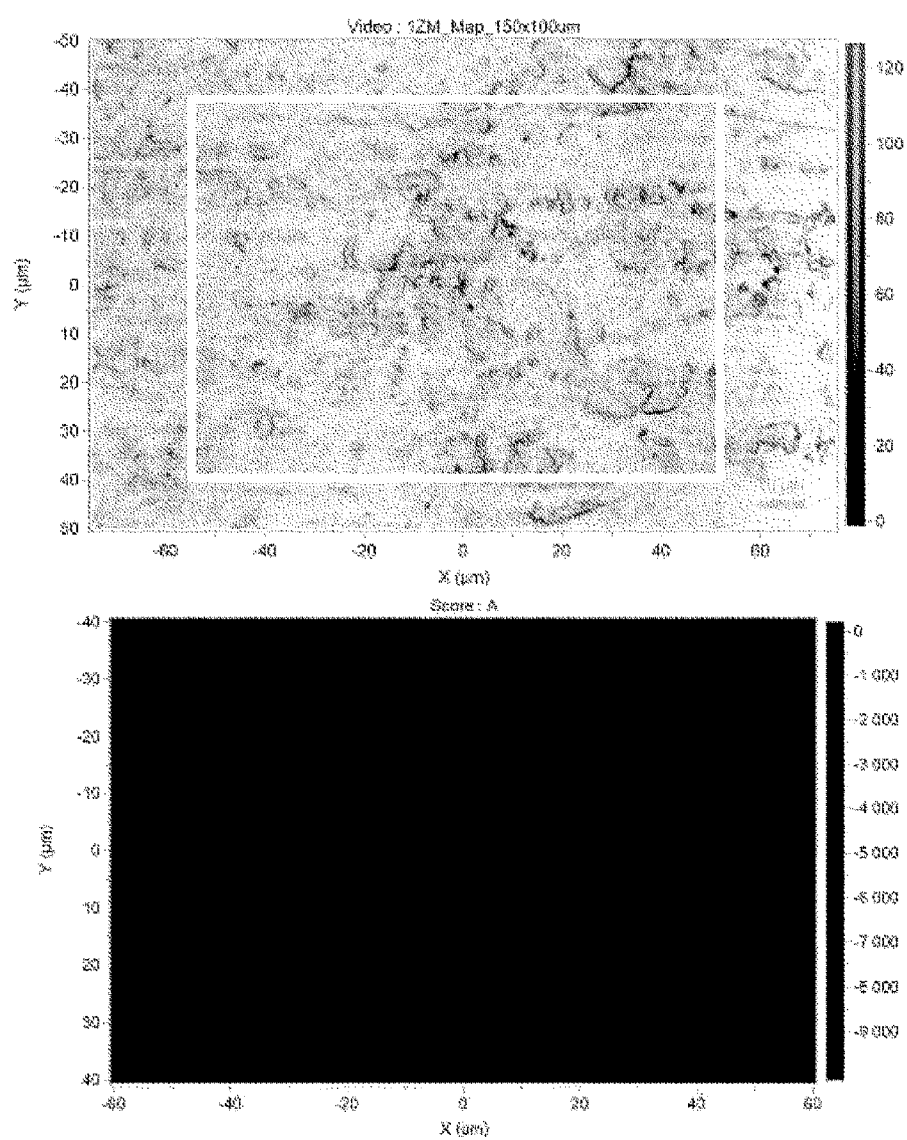
FIG. 1B is a photograph of the surface of a titanium material (a comparative example) having an area percentage of a Ti-containing compound of 0% and is a view showing the distribution of the Ti-containing compound having a peak in the range of 320 to 350 $cm^{-1}$ in the spectrum obtained by the Raman spectroscopy.

When the above Ti-containing compound is present on the surface of the titanium material, then, a Ti-based oxide, which is the nucleus of the growth of the coating film during the electrodeposition coating, is easily formed. As a result, the electrodeposition coating film grows easily and uniformly, and the coated titanium material improves the adhesion and peeling strength of the coating film. This can be described with reference to FIGS. 1A and 1B. FIG. 1A shows an example in which the area percentage of the Ti-containing compound is 25.0%, and then, the adhesion of a coating film formed on a coated titanium material was excellent. On the other hand, FIG. 1B shows an example in which the area percentage of the Ti-containing compound is 0%, and then, the adhesion of a coating film formed on a coated titanium material is poor.

Although these mechanisms have not been clarified in detail, it is presumed to be due to the following mechanisms. Specifically, at the time of the electrodeposition coating, the Ti-containing compound on the titanium surface is initially dissolved, and then, titanium ions immediately precipitate as a Ti-based oxide on the titanium surface. The precipitated Ti-based oxide becomes the precipitation nuclei of particles of an electrodeposition coating material, a uniform coating film grows, and an electrodeposition coating film having excellent adhesion and peeling strength is obtained.

In the measurement by the Raman spectroscopy, the measurement conditions are: excitation wavelength: 532 nm, number of diffraction grating lines: 600 Lines/mm, objective lens: 100 times, as shown below. Additionally, in the titanium material, mapping is carried out in 0.75 (µm steps) and 13041 (points) in a region of 120 (µm)×60 (µm) on a surface.

1-3. Area Percentage of Ti-Containing Compound

In the titanium material according to the present disclosure, the area percentage of the Ti-containing compound coating the surface is 10.0 to 50.0%. When the area percentage of the Ti-containing compound on the surface is less than 10.0%, the Ti-based oxide, which serves as the starting point of the growth of the coating film, is not sufficiently generated, and the coating film adhesion and the peeling strength decrease. For this reason, the area percentage of the Ti-containing compound on the surface is set to 10.0% or more. The area percentage of the Ti-containing compound may be 15.0% or more, 20.0% or more, 25.0% or more, or 30.0% or more.

When the area percentage of the Ti-containing compound on the surface is 50.0% or less, the area percentage of the Ti-based oxide, which serves as the starting point of the coating film growth, exceeds 90%, and a sufficiently high peeling strength of the electrodeposition coating film is obtained. On the other hand, when the area percentage of the Ti-containing compound on the surface exceeds 50.0%, this Ti-containing compound remains partially. Therefore, there is a case where the adhesion and peeling strength of the coating film decrease. For this reason, the area percentage of the Ti-containing compound on the surface is set to 50.0% or less. The area percentage of the Ti-containing compound may be 45.0% or less, 40.0% or less, or 35.0% or less.

The area percentage of the Ti-containing compound is calculated by the following procedure. Specifically, a 50 (mm)×50 (mm) test piece for Raman spectroscopic analysis having a surface on which the coating film is formed, that is, a surface perpendicular to a coating film lamination direction as an observed section is cut out from the titanium material. Subsequently, the observed section is measured by the Raman spectroscopy. In addition, the measurement conditions by the Raman spectroscopy are as described above. The area of a Ti-containing compound obtained by image analysis of the mapping data obtained by the measurement is divided by the area of an observed visual field, and a value obtained by expressing the resulting area as a percentage is taken as the area percentage of the Ti-containing compound.

2. Coated Titanium Material

The coated titanium material according to the present disclosure includes the titanium material and the coating film formed on the surface of the titanium material.

2-1. Titanium Material

As the titanium material, for example, the above-described titanium material may be used. Additionally, a titanium material obtained by subjecting the above-described titanium material to the chemical conversion may be used. Although the chemical conversion will be described below, either a Zr-based chemical conversion or a zinc phosphate-based chemical conversion may be used. In addition, as described above, the Ti-containing compound that coats a part of the surface of the titanium substrate may be altered in a coating step. For that reason, the coated titanium material may not contain the Ti-containing compound.

2-2. Coating Film

The type of the coating film is not particularly limited but may be, for example, the electrodeposition coating film. In the case of the electrodeposition coating film, a modified epoxy resin-based electrodeposition coating film formed by cation electrodeposition is preferable.

2-3. Ti-Based Oxide

The coated titanium material according to the present disclosure includes the Ti-based oxide at the interface between the titanium material and the coating film. The Ti-based oxide includes one or both of the rutile type $TiO_2$ and $Ti_2O_3$. In addition, there are two types of $TiO_2$, rutile type and anatase type, and the coated titanium material according to the present disclosure includes the rutile type $TiO_2$.

2-4. Area Percentage of Ti-Based Oxide

In the coated titanium material according to the present disclosure, the area percentage of the Ti-based oxide is defined. In the coated titanium material according to the present disclosure, the area percentage of the Ti-based oxide is 30.0% or more. The area percentage of the Ti-based oxide may be 35.0% or more, 40.0% or more, 45.0% or more, or 50.0% or more. In addition, the larger the amount of Ti-based oxide formed, the more preferable. Therefore, the upper limit of the amount is not particularly set. Therefore, the area percentage of the Ti-based oxide is 100% or less. The area percentage of the Ti-based oxide may be 95.0% or less, 90.0% or less, 80.0% or less, or 70.0% or less.

Figure 2:
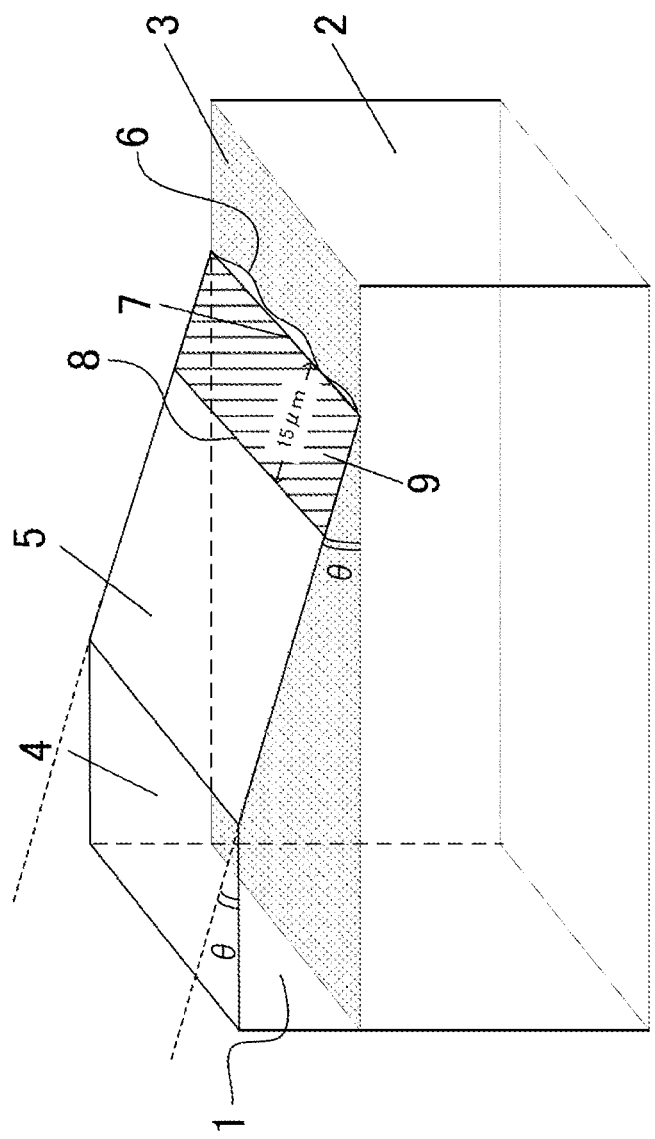
FIG. 2 is a schematic view showing a cut surface of a coating film in a coated titanium material cut by a Saicas method.

The thickness of the coating film is not particularly limited. However, for example, in a case where the coating film is the electrodeposition coating film, the film thickness thereof is usually extremely thin, about 15 µm. In this case, it is difficult to observe the inside of the coating film or the vicinity of a surface where the coating film and the titanium material are in contact (hereinafter, also referred to as an interface). For this reason, the area percentage of the Ti-based oxide is calculated by the Saicas method using a surface/interface physical property analysis device described below. In this case, a cut surface 5 of a coating film 1 is formed so as to be an oblique surface with respect to an interface 3 between the coating film 1 and a titanium material 2 as shown in FIG. 2. Specifically, a coating film cutting unit (cutting blade) is moved under the conditions of a horizontal speed of 2 μm/sec and a vertical speed of 0.1 μm/sec to form the cut surface 5 of the coating film 1. When an angle formed by the cut surface 5 and the interface 3 is θ, the above angle θ can be obtained from a geometric relationship between the horizontal speed and the vertical speed, that is, tan θ that is a ratio between the horizontal speed and the vertical speed. Therefore, the angle θ is 2.7° under the conditions of a horizontal speed of 2 μm/sec and a vertical speed of 0.1 μm/sec.

An intersection line between the cut surface 5 and the interface 3 is defined as a boundary line 6. When the coating film 1 is sheared using the Saicas method, the cutting blade receives resistance. For this reason, there is often a case the boundary line 6 is a curved line rather than a straight line. In a case where the boundary line 6 is a curved line, it is difficult to calculate the area percentage. For that reason, the reference line 7 for calculating the area percentage is specified.

Figure 3:
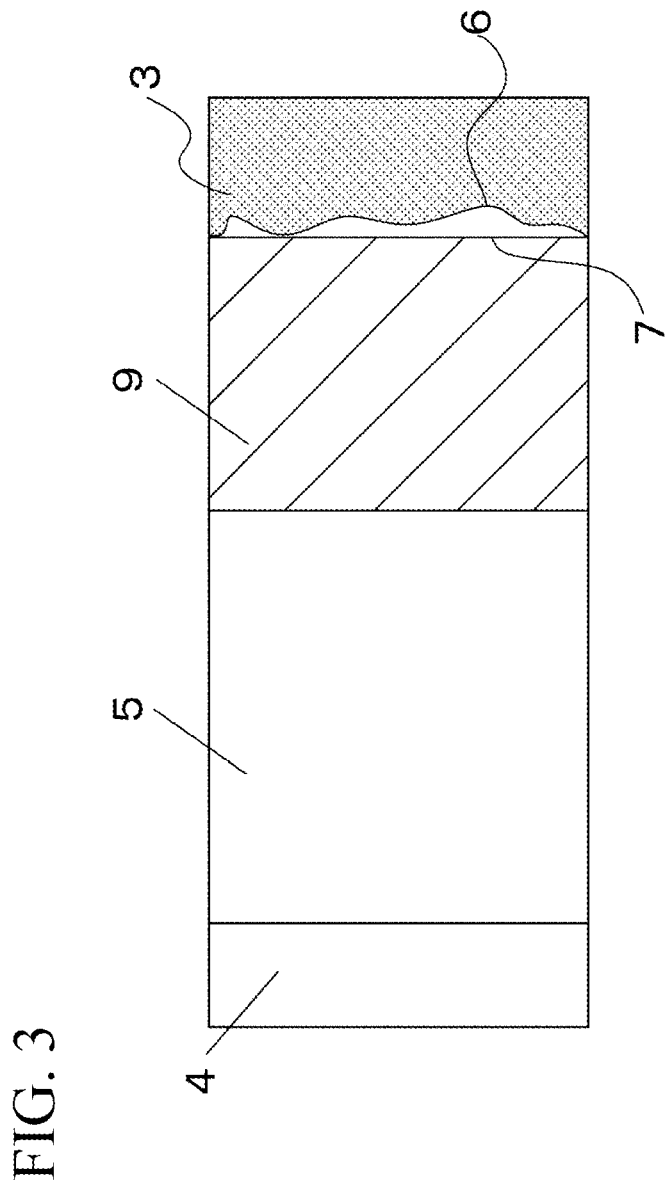
FIG. 3 is a schematic view showing a method of determining a reference line on the cut surface of the coating film of the coated titanium material cut by the Saicas method.

Hereinafter, a method of determining the reference line on the cut surface of the coating film of the coated titanium material cut by the Saicas method will be shown with reference to FIG. 3. FIG. 3 is a schematic view when the cut surface 5 is observed from a surface side of the coating film in a direction perpendicular to the interface 3. A straight line, which is perpendicular to the coating film lamination direction (that is, a traveling direction of the cutting blade) and is tangent to a point (that is, a point close to the surface 4 of the coating film in a boundary line 6 that is an end portion of the cut surface 5) closest to a coating film side, in the boundary line is specified as a reference line 7.

This will be described again with reference to FIG. 2. Subsequently, a straight line 8 having a distance of 15 μm from the reference line 7 to the coating film side is specified on the cut surface 5. Then, the area percentage of the Ti-based oxide in a region 9 between the reference line 7 and the straight line 8 on the cut surface 5 is calculated by the Raman spectroscopy.

Here, the conditions of the Saicas method of obtaining the observed section for measuring the area percentage of each Ti-based oxide by the above Raman spectroscopy using a coated titanium material will be described. As a measuring device, SAICAS (registered trademark) "DN-GS" made by DAIPLA WINTES CO., LTD. is used for measurement. The measurement conditions in this case are measurement mode: constant speed mode, cutting blade: diamond cutting blade (blade width: 300 μm, rake angle: 20°, clearance angle: 10°) as shown below, and horizontal speed: 2.0 μm/sec and vertical speed: 0.1 μm/sec as described above.

Additionally, as described above, the area percentage of each Ti-based oxide is measured by the Raman spectroscopy. As described above, the measurement conditions are excitation wavelength: 532 nm, number of diffraction grating lines: 600 Lines/mm, and objective lens: 100 times. Additionally, in order to obtain the area percentage of the detected compound, mapping of the measurement results is carried out at 0.75 (μm steps) and 3321 (points) in a region of 60 (μm)×30 (μm) on a surface. From this mapping data, the area of each Ti-based oxide in the region 9 is defined as the area percentage of each Ti-based oxide, and a value obtained by expressed the resulting area as a percentage is defined as the area percentage of each Ti-based oxide.

In addition, in the coated titanium material according to the present disclosure, the test piece may have a shape of 0.5 to 1.0 (mm)×5 (mm)×50 (mm), but the size and shape of the region 9 may sufficiently fall within the observed visual field.

3. Properties Evaluation

In the titanium material according to the present disclosure, the adhesion of the coating film is evaluated by the presence or absence of exfoliation in a cross-cut adhesion test and a DuPont impact test. Additionally, as for the peeling strength, the peeling strength is evaluated to be excellent in a case where the peeling strength is almost the same as that in a case where the steel material is subjected to a general chemical conversion and the electrode position coating film is formed.

Specifically, the peeling strength of the steel material on which the above-described electrodeposition coating film is formed is measured by the surface/interface physical property analysis device using the Saicas method. After that, the peeling strength of the coating film is similarly measured for the coated titanium material. Evaluation is performed with a value obtained by dividing (hereinafter, also referred to as "relative peeling strength") the measured peeling strength of the titanium material by the peeling strength of the steel material, and, when the peeling strength is 1.0 or more, the peeling strength is determined to be excellent.

In addition, the peeling strength is also measured using the above-described SAICAS (registered trademark) "DN-GS" made by DAIPLA WINTES CO., LTD. The measurement conditions in this case are measurement mode: constant speed mode, cutting blade: diamond cutting blade (blade width: 300 μm, rake angle: 20°, clearance angle: 10°), horizontal speed: 1.0 μm/sec, and vertical speed: 0.1 μm/sec as shown below, and the blade is switched to horizontal movement only and the peeling strength is measured at a depth where an exfoliation phenomenon is confirmed. In addition, the angle θ formed by the interface and the cut surface is 5.7° from the above horizontal speed and vertical speed.

4. Production Method

Hereinafter, preferable methods of producing the titanium material and the coated titanium material according to the present disclosure will be described. The titanium material and the coated titanium material according to the present disclosure can obtain the effects as long as the above-described configuration is provided regardless of the production methods. However, the titanium material and the coated titanium material according to the present disclosure can be stably obtained, for example, by production methods as described below.

4-1. Titanium Material Production Method

A titanium ingot with an adjusted chemical composition is made. Subsequently, the obtained titanium ingot is heated and subjected to hot working. The hot working method is not particularly limited, and hot rolling, hot forging, and the like are exemplary examples. In addition, it is preferable to remove scales generated in the hot working by shot peening, pickling, or the like.

After that, cold working is performed to obtain a predetermined shape. The cold working method is not particularly limited, and cold rolling, cold pressing, cold forging, cold cutting, and the like are exemplary examples. In addition, a plurality of pieces having a predetermined shape after the cold working may be joined together to form an integral component shape. In addition, after the hot and cold working, heat treatment such as annealing may be appropriately performed. The heat treatment is preferably performed in a vacuum or Ar and He gas that is a non-oxidation-and-nitriding atmosphere in order to suppress oxidation and nitriding of titanium.

The titanium material according to the present embodiment includes the titanium substrate and the Ti-containing compound that coats a part of the surface of the titanium substrate. The Ti-containing compound is, for example, the Ti-containing compound including two or more elements selected from the group consisting of Fe, C, O, and N. In order to dispose the Ti-containing compound on the surface of the titanium material, it is necessary to concentrate, for example, elements such as Fe, C, O, and N on the surface of the titanium material. As the present inventors have found, for example, lubricating oil during the cold working may contain 20 ppm or more of Fe. Preferably, the concentration of Fe contained in the lubricating oil is 200 ppm or more. Accordingly, the Ti-containing compound can be disposed on the surface of the titanium material. It is presumed that the cause of such a phenomenon is that Fe in the lubricating oil constitutes the Ti-containing compound and/or Fe or a compound thereof exhibits a catalytic action to generate the Ti-containing compound.

In addition, the Fe concentration in normal lubricating oil for cold-rolling titanium is about 1 ppm. Therefore, there is a case where it is necessary to add iron oxide or the like to the lubricating oil in order to increase the Fe concentration.

Additionally, in a case where the cold rolling is performed, it is desirable that a roll used for the cold rolling is a roll containing Fe, and the roll itself is relatively easily worn. Moreover, it is desirable that both the rolling reduction per one pass and the speed of the rolling are large. Specifically, in the cold rolling, the rolling reduction per one pass is 10 to 30%, and the rolling speed is 200 mpm or more. The rolling speed is preferably 300 mpm or more and 450 mpm or less. Moreover, cold rolling of a plurality of passes is performed under this condition. The number of passes is preferably 4 or more. Accordingly, the Ti-containing compound is more uniformly formed. It is presumed that, by strongly reducing titanium in a state where the lubricating oil containing Fe is applied in this way, a mechanochemical reaction occurs and the above-described unique surface properties are obtained.

In addition, after the cold working, the alkaline cleaning, the annealing, and the like may be appropriately carried out as necessary.

4-2. Coated Titanium Material Production Method 4-2-1. Alkaline Degreasing

Alkaline degreasing is performed on the titanium material. For the alkaline degreasing, for example, FC-E2001 made by Nihon Parkerizing Co., Ltd. may be used.

4-2-2. Chemical Conversion

The titanium material may be appropriately subjected to chemical conversion as necessary. The chemical conversion is not essential from the viewpoint of securing the peeling strength of the coating film. However, by performing the chemical conversion of the titanium material before the coating, it is possible to further suppress the generation of bubbles during the coating and further improve the uniformity of the coating film. Hereinafter, preferable chemical conversion conditions will be exemplified.

In the chemical conversion, a Zr-based chemical conversion solution or a zinc phosphate-based chemical conversion solution is usually used as a chemical solution. As the composition of the Zr-based chemical conversion solution, for example, aqueous solutions obtained by neutralizing hexafluorozirconium acid, $Zr(SO_4)_2$, $Zr(NO_3)_4$, $H_2ZrF_6$, and the like with ammonium and the like are exemplary examples.

Additionally, as the composition of the zinc phosphate-based chemical conversion solution, solutions that have a saturated aqueous solution of zinc phosphate $[Zn_3(PO_4)_2]$ as a base, contain zinc ion: 2.5 g/L, phosphate ion: 25 g/L (adjusted by adding phosphoric acid), nitrate ion: 25 g/L (adjusted by adding nitric acid), and fluorine ion: 500 ppm (adjusted by adding sodium fluoride), and are obtained by adjusting free acidity to 1.5 points using sodium hydroxide are exemplary examples. In addition, commercially available Zr-based chemical conversion solutions or zinc phosphate-based chemical conversion solutions may be used.

In addition, in a case where the zinc phosphate-based chemical conversion solution is used as the chemical conversion solution, surface adjustment for adsorbing titanium-based and zinc-based colloidal particles may be performed such that precipitation sites of zinc phosphate or the like are formed before the chemical conversion. For the surface adjustment in this case. PL-ZT or PL-XG made by Nihon Parkerizing Co., Ltd. can be used.

Additionally, the treatment temperature and treatment time of the chemical conversion may be usually carried out within the range of implementation, but for example, the chemical conversion temperature is preferably in a range of 30 to 50° C. The chemical conversion time is preferably in a range of 60 to 180 seconds. The treatment temperature and treatment time for the surface adjustment may be usually within the range of implementation, but for example, the surface adjustment temperature is preferably in a range of 25 to 40° C. The surface adjustment time is preferably in a range of 10 to 60 seconds.

4-2-3. Formation of Coating Film

The coating film is formed on the surface of the titanium material. Hereinafter, as an example of a method of forming the coating film, a case where the coating film is formed on the surface of the titanium material by the electrodeposition coating will be described as an example. In a case where the chemical conversion is performed, it is preferable to apply the electrodeposition coating after the chemical conversion.

As the electrodeposition coating material, it is desirable to use a modified epoxy resin-based coating material. In addition, commercially available products may be used, and for example, PN-1010 made by NIPPONPAINT is exemplified. Additionally, it is preferable to apply a voltage using the titanium material as a cathode to perform the electrodeposition coating, that is, the cation electrodeposition such that the film thickness of the electrodeposition coating film is in a range of 15 to 25 μm. After that, it is preferable to perform baking at 160 to 200° C. for 10 to 30 minutes. It is not preferable that the electrodeposition coating is anion electrodeposition (electrodeposition coating that allows an electric current to flow through a metallic material serving as an anode). This is considered to be because, in the anion electrodeposition, a titanium oxide layer having low conductivity is formed on the surface of the titanium material due to anodization. In this case, it becomes difficult for an electric current to flow uniformly. As a result, it is presumed that it becomes difficult to control the thickness of the electrodeposition coating film, a uniform coating film is not formed, and the coating film adhesion and peeling strength decrease.

In addition, after the above baking, a finish coating may be performed. As the finish coating, intermediate coating for hiding the surface roughness of the electrodeposition coating and improving chipping resistance, base coating for coloring, clear coating for obtaining beautiful finish and durability, and the like are exemplary examples. In addition, as the coating materials for these, a melanin-based resin for the intermediate coating, an acrylic resin for the base coloring, and an acrylic resin for the clear coating are exemplary examples.

Hereinafter, the present disclosure will be more specifically described with reference to examples, but the present disclosure is not limited to these examples.

Example 1

Titanium materials having chemical compositions shown in Table 1-1 were made. In addition, in this case, titanium ingots having the chemical compositions shown in Table 1 were hot-rolled, then shot blasting and pickling were performed for descaling, and then, cold rolling was performed under the cold rolling conditions as described in Table 1-2. After titanium materials T1 to T6 and T9 to T12 were subjected to the above-described cold rolling, alkaline cleaning was performed, and then batch annealing was performed at 650° C. for 240 minutes in a vacuum and Ar gas atmosphere.

As for a titanium material of T7, in the cold rolling, the conditions were such that the rolling reduction per one pass, the speed of the cold rolling, and the Fe concentration of the cold rolling oil are all the smallest. After that, the alkaline cleaning and the batch annealing were performed under the same conditions as those of the titanium materials such as T1 to T6. Titanium materials T8 and T13 to T16 were cold-rolled, then batch-annealed at 650° C. for 240 minutes in a vacuum and Ar gas atmosphere, then pickled using nitric hydrofluoric acid, and scarfed to 8 to 11 μm from the surfaces thereof.

As for these titanium materials, samples of 50 (mm)×50 (mm) were made, and the spectrum thereof was measured by the Raman spectroscopy. A microscopic laser Raman spectroscopy measurement device LabRAM HR Evolution made by HORIBA, LTD. was used for the measurement. Additionally, the measurement conditions were excitation wavelength: 532 nm, number of diffraction grating lines: 600 Lines/mm, and objective lens: 100 times. Additionally, in the titanium materials, mapping was carried out in 0.75 (μm steps) and 13041 (points) in a region of 120 (μm)×60 (μm) on a surface.

In Table 1, items of the presence or absence of peak were described as present with respect to titanium materials each having a peak in a range of 320 to 350 $cm^{-1}$, which is the peak of the Ti-containing compound in the spectrum, and the items were described as absent with respect to titanium materials that had no peak in the above range. In addition, when the above Ti-containing compound of each titanium material was subjected to the Auger electron spectroscopy, the Ti-containing compound contained 10 to 14%, Fe: 8 to 9%, C: 27 to 40%, and O: 40 to 50%. Besides, an extremely small amount of S was detected in about 1%. In addition, in the Auger electron spectroscopy, N cannot be detected separately from Ti, but in view of the analysis results of XPS (X-ray photoelectron spectroscopy), N is also considered to be contained in the Ti-containing compound.

In addition, the area percentage of the Ti-containing compound is calculated by the following procedure. Specifically, in each titanium material, a 50 (mm)×50 (mm) test piece for the Raman spectroscopic analysis is cut out with a surface on which a coating film is formed, that is, a surface perpendicular to the coating film lamination direction as an observed section. Subsequently, the observed section is measured by the Raman spectroscopy.

As shown below, the measurement conditions are excitation wavelength: 532 nm, number of diffraction grating lines: 600 Lines/mm, and objective lens: 100 times. Additionally, in order to obtain the area percentage of the detected compound, mapping of the measurement results was carried out at 0.75 (μm steps) and 13041 (points) in a region of 120 (μm)×60 (μm) on a surface. The area of a Ti-containing compound obtained from this mapping data is divided by the area of an observed visual field, and a value obtained by expressing the resulting area as a percentage is taken as the area percentage of the Ti-containing compound.

Additionally, as will be described below, in order to compare the peeling strength of a coating film with that in a case where treatment was performed using a steel material, a commercially available steel material having a chemical composition shown in Table 2 was prepared.

TABLE 1-1

| Type of titanium | Chemical composition (mass %, Remainder: Ti and impurities) | | | | | | |
|---|---|---|---|---|---|---|---|
| | C | H | O | N | Fe | Al | V |
| T1 | 0.003 | 0.0023 | 0.043 | 0.002 | 0.032 | — | — |
| T2 | 0.002 | 0.0024 | 0.044 | 0.002 | 0.030 | — | — |
| T3 | 0.003 | 0.0020 | 0.046 | 0.003 | 0.032 | — | — |
| T4 | 0.003 | 0.0020 | 0.042 | 0.003 | 0.032 | — | — |
| T5 | 0.002 | 0.0023 | 0.045 | 0.002 | 0.032 | — | — |
| T6 | 0.003 | 0.0022 | 0.046 | 0.002 | 0.032 | — | — |
| T7 | 0.002 | 0.0019 | 0.042 | 0.002 | 0.032 | — | — |
| T8 | 0.003 | 0.0021 | 0.044 | 0.003 | 0.032 | — | — |
| T9 | 0.003 | 0.0024 | 0.112 | 0.003 | 0.055 | — | — |
| T10 | 0.002 | 0.0020 | 0.310 | 0.002 | 0.200 | — | — |
| T11 | 0.002 | 0.0022 | 0.120 | 0.003 | 0.042 | 3.02 | 2.46 |
| T12 | 0.002 | 0.0022 | 0.345 | 0.003 | 1.020 | — | — |
| T13 | 0.003 | 0.0024 | 0.115 | 0.002 | 0.057 | — | — |
| T14 | 0.003 | 0.0020 | 0.312 | 0.002 | 0.201 | — | — |
| T15 | 0.002 | 0.0022 | 0.121 | 0.003 | 0.045 | 3.02 | 2.47 |
| T16 | 0.002 | 0.0022 | 0.351 | 0.003 | 1.011 | — | — |

The symbol "*" means that the value was out of the scope of certain embodiments of the disclosure.

TABLE 1-2

| Type of titanium | Fe concentration in lubricating oil # (cold rolling oil) (mass ppm) | Rolling reduction per one pass (%) | Rolling speed (mpm) | Number of passes performed in condition described in left column | Remarks | Ti-containing compound Presence or absence of peak | Area percentage (%) | Remarks | |
|---|---|---|---|---|---|---|---|---|---|
| T1 | 242 | 12 | 408 | 5 | | Presense | 47.4 | Industrial pure titanium JIS type 1 | Inventive example |
| T2 | 242 | 12 | 304 | 4 | | Presense | 34.5 | | |
| T3 | 242 | 18 | 408 | 5 | | Presense | 49.8 | | |
| T4 | 25 | 15 | 204 | 5 | | Presense | 12.2 | | |
| T5 | 201 | 11 | 302 | 5 | | Presense | 25.0 | | |
| T6 | 20 | 15 | 204 | 4 | | Presense | 10.4 | | |
| T7 | 5 | 10 | 84 | 4 | Conventional condition* | Presense | 6.9* | | Comparative example |
| T8 | Pickling T2 using nitric hydrofluoric acid | | | | | Absense* | —* | | |
| T9 | 242 | 18 | 408 | 5 | | Presense | 49.2 | Industrial pure Ti-ASTM Gr.2 | Inventive example |
| T10 | 242 | 13 | 408 | 5 | | Presense | 49.5 | Industrial pure Ti-ASTM Gr.4 | |
| T11 | 242 | 14 | 408 | 5 | | Presense | 48.1 | Ti-3Al-2.5V (JIS type 61, ASTM Gr. 9) | |
| T12 | 242 | 13 | 408 | 5 | | Presense | 49.9 | Ti-1Fe-0.35O | |
| T13 | Pickling T9 using nitric hydrofluoric acid | | | | | Absense* | —* | Industrial pure Ti-ASTM Gr.2 | Comparative example |
| T14 | Pickling T10 using nitric hydrofluoric acid | | | | | Absense* | —* | Industrial pure Ti-ASTM Gr.4 | |
| T15 | Pickling T11 using nitric hydrofluoric acid | | | | | Absense* | —* | Ti-3Al-2.5V (mass %) (JIS type 61, ASTM Gr.9) | |
| T16 | Pickling T12 using nitric hydrofluoric acid | | | | | Absense* | —* | Ti-1Fe-0.35O (mass %) | |

: Fe concentration was controlled by adding Fe powder. The values were obtained by analysising with ICP-AES (plasma emission spectroscopy).

TABLE 2

| Metallic material | Chemical composition (mass %, Remainder: Fe and impurities) | | | | Remarks |
|---|---|---|---|---|---|
| | C | Mn | P | S | |
| Steel material | 0.08 | 0.38 | 0.04 | 0.018 | JIS G3141 SPCC (commercially available material) |

For each of the titanium materials (T1 to T8), a test piece of 50 (mm)×80 (mm) was made and subjected to the zinc phosphate-based chemical conversion under the conditions described below. Prior to the chemical conversion, ultrasonic cleaning was performed for 60 seconds. Subsequently, the titanium material was degreased by using FC-E2001 of Nihon Parkerizing Co., Ltd., setting the solution temperature to 43° C., and immersing the titanium material for 120 seconds. Subsequently, a surface conditioner PL-ZT made by Nihon Parkerizing Co., Ltd. was used to perform immersion shaking treatment at 25° C. for 20 seconds. The titanium material was subsequently cleaned with tap water for 120 seconds. After that, the zinc phosphate-based chemical conversion solution obtained by adjusting PB-L3080 series prepared by Nihon Parkerizing Co., Ltd. was used as a chemical conversion solution, the solution temperature was set to 42° C., and the titanium material was immersed and shaken for 120 seconds. After that, the titanium material was washed with water and dried in a constant temperature layer of 45° C. for 10 minutes.

After the above chemical conversion, each titanium material was used as a cathode and subjected to the electrodeposition coating. As the electrodeposition coating material, a modified epoxy resin-based PN-1010 made by NIPPON-PAINT was used. Additionally, the electrodeposition coating was carried out under the condition that the thickness of the electrodeposition coating film was 15 μm. In addition, the steel material described in Table 2 was subjected to the chemical conversion and the electrodeposition coating in the same procedure as the above titanium materials.

(Measurement of Area Percentage of Ti-Based Oxide)

The area percentages of the rutile type $TIO_2$, $Ti_2O_3$, and the Ti-based oxide in the above coated titanium material and steel material on which the electrodeposition coating film was formed were measured. Specifically, as for a 0.5 to 1.0 (mm)×50 (mm)×50 (mm) sample, a coating film was cut with respect to an interface by the Saicas method using the surface/interface physical property analysis device (SA-ICAS (registered trademark) DN-GS made by DAIPLA WINTES CO., LTD.) to form a cut surface. The measurement conditions in this case were conditions such that the horizontal speed of the cutting blade is 2 μm/sec, the vertical speed is 0.1 μm/sec, and the angle θ between the cut surface and the interface is 2.7°. In addition, in the above-described procedure, a reference line was specified on the basis of a boundary line, which is an intersection line between the cut surface and the interface. Subsequently, the area percentage of a Ti-based oxide in a region of 15 μm from the reference line to a coating film side on the cut surface was calculated by the Raman spectroscopy.

In addition, the setting conditions of the surface/interface physical property analysis device in that case were measurement mode: constant speed mode, cutting blade: diamond cutting blade (blade width: 300 μm, rake angle: 20°, and clearance angle: 10°), and horizontal speed: 2.0 μm/sec and vertical speed: 0.1 μm/sec as described above.

As shown below, the measurement conditions of the Raman spectroscopy were excitation wavelength: 532 nm, number of diffraction grating lines: 600 Lines/mm, and objective lens: 100 times. Additionally, in order to obtain the area percentage of the detected compound, mapping of the measurement results was carried out at 0.75 (μm steps) and 3321 (points) in a region of 60 (μm)×30 (μm) on a surface. A value obtained by expressing the area of each Ti-based oxide in the region in the above-described cut surface obtained by image analysis of this mapping data as a percentage was defined as the area percentage of each Ti-based oxide.

(Evaluation of Adhesion)

The formed electrodeposition coating film was subjected to the DuPont impact test and the cross-cut adhesion test, and the adhesion of the coating film was evaluated. The DuPont impact test was performed by dropping the weight in conformity to JIS K 5600-5-3: 1999. In this case, the diameter of a shooting mold and a pedestal used was 12.7 mm. Additionally, a weight of 500 g was used, and the drop heights were 200 mm and 500 mm. After the test, No. 405 (JIS Z 1522: 2009 compliant product) made by NICHIBAN Co., Ltd. was used to perform a tape exfoliation test to confirm the presence or absence of exfoliation of the coating film. In a case where there was exfoliation at the above two drop heights, it was determined that the adhesion of the coating film was poor.

The cross-cut adhesion test was performed in conformity to JIS K 5600-5-6: 1999. Specifically, 100 grids were made by cutting 11 parallel lines having equal intervals (1 mm) and parallel lines 11 orthogonal to these on a substrate using a small cutter. The tape exfoliation test was carried out on this portion with a tape having a width of 25 mm±1 mm and an adhesion strength of 10±1 N per width in accordance with IEC60454-2. The number of intersection points without exfoliation was investigated out of 100 grids. Here, in a case where the number of exfoliated intersection points was one or more, it was determined that the adhesion of the coating film was poor.

(Measurement of Peeling Strength)

As for the peeling strength, the peeling strength of the steel material on which the above-described electrodeposition coating film was formed was measured using the surface/interface physical property analysis device (SA-ICAS (registered trademark) manufactured by DAIPLA WINTES CO., LTD.) DN-GS similarly to the measurement of the area percentage of the Ti-based oxide. After that, when the peeling strength of the coating film of the titanium material was similarly measured, and a value (hereinafter, also referred to as "relative peeling strength") obtained by divided the measured peeling strength by the peeling strength of the steel material was 1.0 or more, the peeling strength was evaluated as being excellent.

In addition, as for the measurement of the peeling strength, the measurement conditions were measurement mode: constant speed mode, cutting blade: diamond cutting blade (blade width: 300 μm, rake angle: 20°, clearance angle: 10°), horizontal speed: 1.0 μm/sec, and vertical speed: 0.1 μm/sec as shown below, and the blade was switched to the horizontal movement only and the peeling strength was measured at a depth where an exfoliation phenomenon was confirmed. In addition, the angle θ is 5.7° from the above horizontal speed and vertical speed.

Hereinafter, the results are shown in Table 3.

TABLE 3

| | | Titanium material Ti-containing compound | | Coated titanium material | | | | | | |
|---|---|---|---|---|---|---|---|---|---|---|
| | | | | Rutile type $TiO_2$ | $Ti_2O_3$ | Ti-based oxide | Properties evaluation | | | |
| Test No. | Titanium type/ Steel type | Presence or absence of peak | Area percentage (%) | area percentage (%) | area percentage (%) | area percentage (%) | Cross-cut adhesion test | DuPont impact test | Relative peeling strength | Remarks |
| 1 | T1 | Presense | 47.4 | — | 94.8 | 94.8 | No exfoliation point | No exfoliation | 1.17 | — | Inventive example |
| 2 | T2 | Presense | 34.5 | — | 72.0 | 72.0 | No exfoliation point | No exfoliation | 1.15 | — |

TABLE 3-continued

| | Titanium type/ Steel type | Titanium material Ti-containing compound | | Coated titanium material | | | Properties evaluation | | | |
|---|---|---|---|---|---|---|---|---|---|---|
| Test No. | | Presence or absence of peak | Area percentage (%) | Rutile type $TiO_2$ area percentage (%) | $Ti_2O_3$ area percentage (%) | Ti-based oxide area percentage (%) | Cross-cut adhesion test | DuPont impact test | Relative peeling strength | Remarks |
| 3 | T3 | Presense | 49.8 | 98.7 | — | 98.7 | No exfoliation point | No exfoliation | 1.21 | — |
| 4 | T4 | Presense | 12.2 | 30.9 | — | 30.9 | No exfoliation point | No exfoliation | 1.05 | — |
| 5 | T5 | Presense | 25.0 | 21.0 | 29.1 | 50.1 | No exfoliation point | No exfoliation | 1.10 | — |
| 6 | T6 | Presense | 10.4 | 11.0 | 19.2 | 30.2 | No exfoliation point | No exfoliation | 1.01 | — |
| 7 | T7 | Presense | 6.9* | 13.8 | — | 13.8* | No exfoliation point | No exfoliation | 0.87 | Comparative example |
| 8 | T8 | Absense* | —* | —* | —* | —* | No exfoliation point | Very small exfoliation was caused with 500 mm of drop height | 0.83 | Compound other than resin was not detected |
| 9 | S | Absense* | —* | —* | —* | —* | No exfoliation point | No exfoliation | 1.00 | Zn was entirely distributed, Reference example |

The symbol "*" means that the value was out of the scope of certain embodiments of the disclosure.
"Underline" means that the value was out of the scope of the properties which is the target of certain embodiments of the disclosure.

Since Test Nos. 1 to 6 are coated titanium materials that satisfy the provisions of the present disclosure, the coating film adhesion is excellent, and the peeling strength of the coating film is also almost equal to or higher than that of the steel material, which is excellent. This is because the titanium material used for each coated titanium material satisfied the provisions of the present disclosure and contained the Ti-containing compound and the area percentage thereof was 10.0% or more. As a result, this is considered to be the effect that the area percentage of the Ti-based oxide after the coating was 30% or more. Among them, particularly in Test Nos. 1 to 3 and 5, each titanium material contained the Ti-containing compound and the area percentage thereof was 25.0% or more. Therefore, it can be seen that, when the relative peeling strength of the coated titanium material is 1.1 or more, a coating film having a higher peeling strength is formed. On the other hand, Test No. 7 and No. 8 did not satisfy the provisions of the present disclosure and had the result that the adhesion of the coating film or the peeling strength, or any combination thereof was inferior.

Example 2

Similarly to Example 1, a 50 (mm)×80 (mm) test piece was made from each of the titanium materials (T1 to T8) described in Table 1, and the Zr-based chemical conversion was performed under each of the following conditions. Prior to the chemical conversion, ultrasonic cleaning was performed for 60 seconds. Subsequently, degreasing was performed by using FC-E2001 of Nihon Parkerizing Co., Ltd., setting the solution temperature to 43° C., and immersing the test piece for 120 seconds. Subsequently, the test piece was cleaned with tap water for 120 seconds. After that, a chemical conversion solution adjusted to pH=4 with hexafluoroammonium zirconate 10 mM/L, ammonia, and nitric acid was used as the chemical conversion solution, and the test piece was immersed at a solution temperature of 45° C. for 120 seconds. After that, the test piece was washed with water and dried in a constant temperature layer of 45° C. for 10 minutes.

After the above chemical conversion, each titanium material was used as a cathode and subjected to the electrodeposition coating. The electrodeposition coating material and the test conditions used for the electrodeposition coating were the same as those of Example 1. In addition, the steel material described in Table 2 was subjected to the chemical conversion and the electrodeposition coating in the same procedure as the above titanium materials.

In each coated titanium material on which the electrodeposition coating film was formed, the area percentages of the rutile type $TiO_2$, $Ti_2O_3$, and the Ti-based oxide were measured by the same procedure as that of Example 1. Additionally, the DuPont impact test, the cross-cut adhesion test, and the peeling strength of the coating film were also measured by the same procedure as that of Example 1.

Hereinafter, the results are shown in Table 4.

TABLE 4

| Test No. | Titanium type/Steel type | Titanium material Ti-containing compound Presence or absence of peak | Titanium material Ti-containing compound Area percentage (%) | Coated titanium material Rutile type TiO$_2$ area percentage (%) | Coated titanium material Ti$_2$O$_3$ area percentage (%) | Coated titanium material Ti-based oxide area percentage (%) | Properties evaluation Cross-cut adhesion test | Properties evaluation DuPont impact test | Properties evaluation Relative peeling strength | Remarks | |
|---|---|---|---|---|---|---|---|---|---|---|---|
| 10 | T1 | Presense | 47.4 | — | 91.8 | 91.8 | No exfoliation point | No exfoliation | 1.15 | — | Inventive example |
| 11 | T2 | Presense | 34.5 | — | 70.1 | 70.1 | No exfoliation point | No exfoliation | 1.12 | — | |
| 12 | T3 | Presense | 49.8 | 93.2 | — | 93.2 | No exfoliation point | No exfoliation | 1.16 | — | |
| 13 | T4 | Presense | 12.2 | 38.1 | — | 38.1 | No exfoliation point | No exfoliation | 1.07 | — | |
| 14 | T5 | Presense | 25.0 | 21.0 | 30.0 | 51.0 | No exfoliation point | No exfoliation | 1.10 | — | |
| 15 | T6 | Presense | 10.4 | 10.0 | 20.3 | 30.3 | No exfoliation point | No exfoliation | 1.02 | — | |
| 16 | T7 | Presense | 6.9* | 12.0 | — | 12.0* | No exfoliation point | No exfoliation | 0.84 | — | Comparative example |
| 17 | T8 | Absense* | —* | —* | —* | —* | No exfoliation point | Very small exfoliation was caused with 500 mm of drop height | 0.81 | Compound other than resin was not detected | |
| 18 | S | Absense* | —* | —* | —* | —* | No exfoliation point | No exfoliation | 1.00 | Zr was entirely distributed | Reference example |

The symbol "*" means that the value was out of the scope of certain ombodiments of the disclosure.

"Underline" means that the value was out of the scope of the properties which is the target of certain embodiments of the disclosure.

Since Test Nos. 10 to 15 are coated titanium materials that satisfy the provisions of the present disclosure, the coating film adhesion is excellent, and the peeling strength of the coating film is also almost equal to or higher than that of the steel material, which is excellent. This is because the titanium material used for each coated titanium material satisfied the provisions of the present disclosure and contained the Ti-containing compound and the area percentage thereof was 10.0% or more. As a result, this is considered to be the effect that the area percentage of each Ti-based oxide after the coating was 30% or more. Among them, particularly in Test Nos. 10 to 12, and 14, each titanium material contained the Ti-containing compound and the area percentage thereof was 25.0% or more. Therefore, it can be seen that, when the relative peeling strength of the coated titanium material is 1.1 or more, a coating film having a higher peeling strength is formed. On the other hand, Test No. 16 and No. 17 did not satisfy the provisions of the present disclosure and had the result that the adhesion of the coating film or the peeling strength, or any combination thereof was inferior.

Example 3

Each of the titanium materials (T1 to T8) described in Table 1 was electrodeposition coated without being subjected to the chemical conversion. The electrodeposition coating material and the test conditions used for the electrodeposition coating were the same as those of Example 1. In addition, each steel material described in Table 2 was subjected to the zinc phosphate-based chemical conversion by the same procedure as the steel material in Example 1 and then subjected to the electrodeposition coating.

The area percentages of the rutile type TiO$_2$, Ti$_2$O$_3$, and the Ti-based oxides were measured in the same procedure as that of Example 1. Additionally, the DuPont impact test, the cross-cut adhesion test, and the peeling strength of the coating film were also measured by the same procedure as that of Example 1.

Hereinafter, the results are shown in Table 5.

TABLE 5

| Test No. | Titanium type/ Steel type | Titanium material Ti-containing compound Presence or absence of peak | Titanium material Ti-containing compound Area percentage (%) | Coated titanium material Rutile type TiO₂ area percentage (%) | Coated titanium material Ti₂O₃ area percentage (%) | Coated titanium material Ti-based oxide area percentage (%) | Properties evaluation Cross-cut adhesion test | Properties evaluation DuPont impact test | Properties evaluation Relative peeling strength | Remarks | |
|---|---|---|---|---|---|---|---|---|---|---|---|
| 19 | T1 | Presense | 47.4 | — | 93.9 | 93.9 | No exfoliation point | No exfoliation | 1.16 | — | Inventive Example |
| 20 | T2 | Presense | 34.5 | — | 71.2 | 71.2 | No exfoliation point | No exfoliation | 1.13 | — | |
| 21 | T3 | Presense | 49.8 | 98.0 | — | 98.0 | No exfoliation point | No exfoliation | 1.20 | — | |
| 22 | T4 | Presense | 12.2 | 37.6 | — | 37.6 | No exfoliation point | No exfoliation | 1.04 | — | |
| 23 | T5 | Presense | 25.0 | 21.0 | 30.0 | 51.0 | No exfoliation point | No exfoliation | 1.10 | — | |
| 24 | T6 | Presense | 10.4 | 10.1 | 20.3 | 30.4 | No exfoliation point | No exfoliation | 1.01 | — | |
| 25 | T7 | Presense | 6.9* | 12.5 | — | 12.5* | No exfoliation point | No exfoliation | 0.85 | — | Comparative example |
| 26 | T8 | Absense* | —* | —* | —* | —* | No exfoliation point | Very small exfoliation was caused with 500 mm of drop height | 0.82 | Compound other than resin was not detected | |
| 27 | S | Absense* | —* | —* | —* | —* | No exfoliation point | No exfoliation | 1.00 | Zn was entirely distributed (zinc phosphate-based chemical conversion was included) | Reference Example |

The symbol "*" means that the value was out of the scope of certain embodiments of the disclosure.
"Underline" means that the value was out of the scope of the properties which is the target of certain embodiments of the disclosure.

Since Test Nos. 19 to 24 are coated titanium materials that satisfy the provisions of the present disclosure, the coating film adhesion is excellent, and the peeling strength of the coating film is also almost equal to or higher than that of the steel material, which is excellent. This is because the titanium material used for each coated titanium material satisfied the provisions of the present disclosure and contained the Ti-containing compound and the area percentage thereof was 10.0% or more. As a result, this is considered to be the effect that the area percentage of the Ti-based oxide after the coating was 30% or more. Among them, particularly in Test Nos. 19 to 21, and 23, each titanium material contained the Ti-containing compound and the area percentage thereof was 25.0% or more. Therefore, it can be seen that, when the relative peeling strength of the coated titanium material is 1.1 or more, a coating film having a higher peeling strength is formed. On the other hand, Test No. 25 and No. 26 did not satisfy the provisions of the present discosure and had the result that the adhesion of the coating film or the peeling strength, or any combination thereof was inferior.

Example 4

Each of the titanium materials (T9 to T16) described in Table 1 was subjected to the Zr-based chemical conversion and electrodeposition coated by the same procedure as that of Example 2. In addition, the steel material described in Table 2 was subjected to the chemical conversion and the electrodeposition coating in the same procedure as the above titanium materials.

The area percentages of the rutile type TiO₂, Ti₂O₃, and the Ti-based oxides were measured in the same procedure as that of Example 1. Additionally, the DuPont impact test, the cross-cut adhesion test, and the peeling strength of the coating film were also measured by the same procedure as that of Example 1.

Hereinafter, the results are shown in Table 6.

TABLE 6

| Test No. | Titanium type/Steel type | Titanium material – Ti-containing compound – Presence or absence of peak | Titanium material – Ti-containing compound – Area percentage (%) | Coated titanium material – Rutile type TiO$_2$ area percentage (%) | Coated titanium material – Ti$_2$O$_3$ area percentage (%) | Coated titanium material – Ti-based oxide area percentage (%) | Properties evaluation – Cross-cut adhesion test | Properties evaluation – DuPont impact test | Properties evaluation – Relative peeling strength | Remarks | |
|---|---|---|---|---|---|---|---|---|---|---|---|
| 28 | T9  | Presense | 49.2 | 93.0 | —    | 93.0 | No exfoliation point | No exfoliation | 1.16 | — | Inventive Example |
| 29 | T10 | Presense | 49.5 | 93.4 | —    | 93.4 | No exfoliation point | No exfoliation | 1.16 | — | |
| 30 | T11 | Presense | 48.1 | 90.8 | —    | 90.8 | No exfoliation point | No exfoliation | 1.15 | — | |
| 31 | T12 | Presense | 49.9 | 94.8 | —    | 94.8 | No exfoliation point | No exfoliation | 1.17 | — | |
| 32 | T13 | Absense* | —*   | —*   | —*   | —*   | No exfoliation point | Very small exfoliation was caused with 500 mm of drop height | 0.81 | Compound other than resin was not detected | Comparative example |
| 33 | T14 | Absense* | —*   | —*   | —*   | —*   | No exfoliation point | Very small exfoliation was caused with 500 mm of drop height | 0.82 | | |
| 34 | T15 | Absense* | —*   | —*   | —*   | —*   | No exfoliation point | Very small exfoliation was caused with 500 mm of drop height | 0.82 | | |
| 35 | T16 | Absense* | —*   | —*   | —*   | —*   | No exfoliation point | Very small exfoliation was caused with 500 mm of drop height | 0.83 | | |
| 36 | S   | Absense* | —*   | —*   | —*   | —*   | No exfoliation point | No exfoliation | 1.00 | Zn was entirely distributed (zinc phosphate-based chemical conversion was included) | Reference Example |

The symbol "*" means that the value was out of the scope of certain embodiments of the disclosure.
"Underline" means that the value was out of the scope of the properties which is the target of certain embodiments of the disclosure.

Since Test Nos. 28 to 31 are coated titanium materials that satisfy the provisions of the present disclosure, the coating film adhesion is excellent, and the peeling strength of the coating film is also almost equal to or higher than that of the steel material, which is excellent. This is because the titanium material used for each coated titanium material satisfied the provisions of the present disclosure and contained the Ti-containing compound and the area percentage thereof was 10.0% or more. As a result, this is considered to be the effect that the area percentage of the Ti-based oxide after the coating was 30% or more. Additionally, in Test Nos. 28 to 31, each titanium material contained the Ti-containing compound and the area percentage thereof was 25.0% or more. Therefore, it can be seen that, when the relative peeling strength of the coated titanium material is 1.1 or more, a coating film having a higher peeling strength is formed. On the other hand, Test No. 32 to No. 35 did not satisfy the provisions of the present disclosure and had the result that the adhesion of the coating film or the peeling strength, or any combination thereof was inferior.

Example 5

Titanium materials T17 to T31 were obtained by using the titanium materials T2, 17, and T8 described in Table 1-2 as starting materials and these starting materials were subjected to anodization treatment under the conditions described in Table 7. Chemical conversion was not performed on these titanium materials T17 to T31. After the above anodization treatment, the electrodeposition coating was performed using each titanium material as a cathode. The electrodeposition coating material and the test conditions used for the electrodeposition coating were the same as those of Example 1.

In each coated titanium material on which the electrodeposition coating film was formed, the area percentages of the rutile type $TiO_2$, $Ti_2O_3$, and the Ti-based oxide were measured by the same procedure as that of Example 1. Additionally, the DuPont impact test, the cross-cut adhesion test, and the peeling strength of the coating film were also measured by the sane procedure as that of Example 1. Hereinafter, the results are shown in Table 8.

TABLE 7

| Titanium type | Titanium type as starting material | Treating condition (anodization treatment, etc) before cathodic electrodeposition coating | |
|---|---|---|---|
| T17 | T2 | 10 V, in aqueous solution with sulfuric acid concentration of 5 mass %, in which titanium was anode | * |
| T18 | T7 | 10 V, in aqueous solution with sulfuric acid concentration of 5 mass %, in which titanium was anode | * |
| T19 | T8 | 10 V, in aqueous solution with sulfuric acid concentration of 5 mass %, in which titanium was anode | * |
| T20 | T2 | 70 V, in aqueous solution with sulfuric acid concentration of 5 mass %, in which titanium was anode | * |
| T21 | T7 | 70 V, in aqueous solution with sulfuric acid concentration of 5 mass %, in which titanium was anode | * |
| T22 | T8 | 70 V, in aqueous solution with sulfuric acid concentration of 5 mass %, in which titanium was anode | * |
| T23 | T2 | 70 V, in aqueous solution with sulfuric acid concentration of 5 mass % and phosphoric acid concentration of 1 mass %, in which titanium was anode | * |
| T24 | T7 | 70 V, in aqueous solution with sulfuric acid concentration of 5 mass % and phosphoric acid concentration of 1 mass %, in which titanium was anode | * |
| T25 | T8 | 70 V, in aqueous solution with sulfuric acid concentration of 5 mass % and phosphoric acid concentration of 1 mass %, in which titanium was anode | * |
| T26 | T2 | 70 V, in aqueous solution with phosphoric acid concentration of 5 mass %, in which titanium was anode | * |
| T27 | T7 | 70 V, in aqueous solution with phosphoric acid concentration of 5 mass %, in which titanium was anode | * |
| T28 | T8 | 70 V, in aqueous solution with phosphoric acid concentration of 5 mass %, in which titanium was anode | * |
| T29 | T2 | 70 V, in aqueous solution with phosphoric acid concentration of 5 mass %, in which titanium was anode >> cleaning with pH11 alkaline aqueous solution | * |
| T30 | T7 | 70 V, in aqueous solution with phosphoric acid concentration of 5 mass %, in which titanium was anode >> cleaning with pH11 alkaline aqueous solution | * |
| T31 | T8 | 70 V, in aqueous solution with phosphoric acid concentration of 5 mass %, in which titanium was anode >> cleaning with pH11 alkaline aqueous solution | * |

The symbol "*" means that the value was out of the scope of certain embodiments of the disclosure.

TABLE 8

| | | Coated titanium material | | | | | | |
|---|---|---|---|---|---|---|---|---|
| | | Rutile type $TiO_2$ area percentage (%) | $Ti_2O_3$ area percentage (%) | Area percentage of Ti-based oxide described in left columns (%) | Properties evaluation | | | |
| Test No. | Titanium type | | | | Cross-cut adhesion test | DuPont impact test | Relative peeling strength | Remarks |
| 37 | T17 | —* | —* | —* | No exfoliation point | Very small exfoliation was caused with 500 mm of drop height | 0.83 | Comparative example |
| 38 | T18 | —* | —* | —* | No exfoliation point | Very small exfoliation was caused with 500 mm of drop height | 0.82 | |
| 39 | T19 | —* | —* | —* | No exfoliation point | Very small exfoliation was caused with 500 mm of drop height | 0.85 | |

TABLE 8-continued

| | | Coated titanium material | | | | | | |
|---|---|---|---|---|---|---|---|---|
| | | Rutile type TiO$_2$ | Ti$_2$O$_3$ area | Area percentage of Ti-based oxide described | Properties evaluation | | | |
| Test No. | Titanium type | area percentage (%) | percentage (%) | in left columns (%) | Cross-cut adhesion test | DuPont impact test | Relative peeling strength | Remarks |
| 40 | T20 | —* | —* | —* | No exfoliation point | Very small exfoliation was caused with 500 mm of drop height | 0.81 | Anatase type TiO$_2$ was detected |
| 41 | T21 | —* | —* | —* | No exfoliation point | Very small exfoliation was caused with 500 mm of drop height | 0.82 | Anatase type TiO$_2$ was detected |
| 42 | T22 | —* | —* | —* | No exfoliation point | Very small exfoliation was caused with 500 mm of drop height | 0.84 | Anatase type TiO$_2$ was detected |
| 43 | T23 | —* | —* | —* | No exfoliation point | Very small exfoliation was caused with 500 mm of drop height | 0.82 | Anatase type TiO$_2$ was detected |
| 44 | T24 | —* | —* | —* | No exfoliation point | Very small exfoliation was caused with 500 mm of drop height | 0.83 | Anatase type TiO$_2$ was detected |
| 45 | T25 | —* | —* | —* | No exfoliation point | Very small exfoliation was caused with 500 mm of drop height | 0.83 | Anatase type TiO$_2$ was detected |
| 46 | T26 | —* | —* | —* | No exfoliation point | Very small exfoliation was caused with 500 mm of drop height | 0.84 | Anatase type TiO$_2$ was detected |
| 47 | T27 | —* | —* | —* | No exfoliation point | Very small exfoliation was caused with 500 mm of drop height | 0.81 | Anatase type TiO$_2$ was detected |
| 48 | T28 | —* | —* | —* | No exfoliation point | Very small exfoliation was caused with 500 mm of drop height | 0.81 | Anatase type TiO$_2$ was detected |
| 49 | T29 | —* | —* | —* | No exfoliation point | Very small exfoliation was caused with 500 mm of drop height | 0.82 | Anatase type TiO$_2$ was detected |
| 50 | T30 | —* | —* | —* | No exfoliation point | Very small exfoliation was caused with 500 mm of drop height | 0.83 | Anatase type TiO$_2$ was detected |
| 51 | T31 | —* | —* | —* | No exfoliation point | Very small exfoliation was caused with 500 mm of drop height | 0.84 | Anatase type TiO$_2$ was detected |
| 52 | T28 | —* | —* | —* | No exfoliation point | Very small exfoliation was caused with 500 mm of drop height | 0.82 | Anatase type TiO$_2$ was detected |

The symbol "*" means that the value was out of the scope of certain embodiments of the disclosure.
"Underline" means that the value was out of the scope of the properties which is the target of certain embodiments of the disclosure.

The peeling strength of the coating film could not be secured in any of the test pieces. It is presumed that this is because the titanium oxide layer having low conductivity was formed by the anodization. When an attempt is made to form the coating film by the cation electrodeposition on the titanium material on which the titanium oxide layer having low conductivity is formed, it is difficult for an electric current to flow uniformly due to insufficient conductivity. As a result, it was presumed that it became difficult to control the thickness of the electrodeposition coating film, a uniform coating film was not formed, and the coating film adhesion and peeling strength decreased.

Example 6

Each of the titanium materials T2, 17, and T8 described in Table 1-2 was subjected to the Zr-based chemical conversion and electrodeposition coated by the same procedure as that of Example 2. Here, the electrodeposition coating was carried out by applying a voltage with titanium as the anode in the modified epoxy resin-based PN-1010 (so-called anion electrodeposition).

In each coated titanium material on which the electrodeposition coating film was formed, the area percentages of the rutile type TIO$_2$, Ti$_2$O$_3$, and the Ti-based oxide were measured by the same procedure as that of Example 1. Additionally, the DuPont impact test, the cross-cut adhesion test, and the peeling strength of the coating film were also measured by the same procedure as that of Example 1. Hereinafter, the results are shown in Table 9.

TABLE 9

| Test No. | Titanium type | Titanium material Ti-containing compound Presence or absence of peak | Titanium material Ti-containing compound Area percentage (%) | Applying voltage with titanium as anode in modified epoxy resin-based PN-1010 (so-called anion electro-deposition) >> Baking | Coated titanium material Rutile type TiO$_2$ area percentage (%) | Coated titanium material Ti$_2$O$_3$ area percentage (%) | Coated titanium material Area percentage of Ti-based oxide described in left columns (%) | Properties evaluation Cross-cut adhesion test | Properties evaluation DuPont impact test | Relative peeling strength | Remarks | |
|---|---|---|---|---|---|---|---|---|---|---|---|---|
| 53 | T2 | Presense | 34.5 | Carried out* | —* | —* | —* | No exfoliation point | Very small exfoliation was caused with 500 mm of drop height | 0.82 | Anatase type TiO$_2$ was detected | Comparative example |
| 54 | T7 | Presense | 6.9* | Carried out* | —* | —* | —* | No exfoliation point | Very small exfoliation was caused with 500 mm of drop height | 0.81 | Anatase type TiO$_2$ was detected | |
| 55 | T8 | Absense* | —* | Carried out* | —* | —* | —* | No exfoliation point | Very small exfoliation was caused with 500 mm of drop height | 0.80 | Anatase type TiO$_2$ was detected | |

The symbol "*" means that the value was out of the scope of certain embodiments of the disclosure.
"Underline" means that the value was out of the scope of the properties which is the target of certain embodiments of the disclosure.

The peeling strength of the coating film could not be secured in any of the test pieces. It is presumed that this is because the electrodeposition coating was the anion electrodeposition.

BRIEF DESCRIPTION OF THE REFERENCE SYMBOLS

1 Coating film
2 Titanium material
3 Interface
4 Surface of coating film
5 Cut surface
6 Boundary line
7 Reference line
8 Straight line with a distance of 15 μm from reference line 7 to coating film side
9 Region where area percentage is calculated

The invention claimed is:

1. A coated titanium material comprising:
a titanium material; and
a coating film formed on a surface of the titanium material,
wherein a Ti-based oxide is included in an interface between the titanium material and the coating film,
the Ti-based oxide is one or both rutile type TiO$_2$ and Ti$_2$O$_3$,
in a case where a cut surface of the coating film is formed under conditions that a horizontal cutting speed is 2 μm/s and a vertical cutting speed is 0.1 μm/s, on the cut surface, an area percentage of the Ti-based oxide is 30.0% or more in a region having a distance of 15 μm from a reference line, which is perpendicular to a lamination direction of the coating film, and which is tangent to a point closest to the coating film in a boundary line, which is an intersection line between the cut surface and the interface on the cut surface, to a coating film side, and
wherein the coating film is a uniform electrodeposition coating film including a modified epoxy resin.

2. A coated titanium material comprising:
a titanium material; and
a coating film formed on a surface of the titanium material,
wherein a Ti-based oxide is included in an interface between the titanium material and the coating film,
the Ti-based oxide is one or both rutile type TiO$_2$ and Ti$_2$O$_3$,
in a case where a cut surface of the coating film is formed under conditions that a horizontal cutting speed is 2 μm/s and a vertical cutting speed is 0.1 μm/s, on the cut surface, an area percentage of the Ti-based oxide is 30.0% or more in a region having a distance of 15 μm from a reference line, which is perpendicular to a lamination direction of the coating film, and which is tangent to a point closest to the coating film in a boundary line, which is an intersection line between the cut surface and the interface on the cut surface, to a coating film side, and
the coating film is an electrodeposition coating film.

* * * * *